US012698639B2

(12) United States Patent
Liu

(10) Patent No.: US 12,698,639 B2
(45) Date of Patent: Aug. 4, 2026

(54) UNDERWATER ROBOT AND CONTROL METHOD THEREFOR

(71) Applicant: Shenzhen Seauto Technology Co., Ltd., Shenzhen (CN)

(72) Inventor: Qiang Liu, Shenzhen (CN)

(73) Assignee: Shenzhen Seauto Technology Co., Ltd., Shenzhen (CN)

( * ) Notice: Subject to any disclaimer, the term of this patent is extended or adjusted under 35 U.S.C. 154(b) by 29 days.

(21) Appl. No.: 19/024,038

(22) Filed: Jan. 16, 2025

(65) Prior Publication Data

US 2025/0270834 A1 Aug. 28, 2025

Related U.S. Application Data

(63) Continuation-in-part of application No. PCT/CN2023/098132, filed on Jun. 2, 2023.

(30) Foreign Application Priority Data

Feb. 23, 2023 (CN) .......................... 202310195054.7

(51) Int. Cl.
*E04H 4/16* (2006.01)
*C02F 1/00* (2023.01)
(Continued)

(52) U.S. Cl.
CPC ........... *E04H 4/1654* (2013.01); *C02F 1/001* (2013.01); *C02F 1/008* (2013.01); *G05D 1/639* (2024.01);
(Continued)

(58) Field of Classification Search
CPC .......... B63C 11/52; C02F 1/001; C02F 1/008; C02F 2103/42; E04H 4/16; E04H 4/1654;
(Continued)

(56) References Cited

U.S. PATENT DOCUMENTS

| | | | | |
|---|---|---|---|---|
| 6,652,742 | B2 * | 11/2003 | Henkin ................. | E04H 4/1654 |
| | | | | 210/167.16 |
| 7,805,792 | B2 * | 10/2010 | Roumagnac .......... | E04H 4/1654 |
| | | | | 210/167.16 |

(Continued)

FOREIGN PATENT DOCUMENTS

| | | | | |
|---|---|---|---|---|
| CN | 115234051 A | 10/2022 | | |
| EP | 4328401 A1 * | 2/2024 | .......... | E04H 4/1654 |
| KR | 20220082503 A * | 6/2022 | ............. | B63B 43/20 |

*Primary Examiner* — Babar Sarwar
(74) *Attorney, Agent, or Firm* — ScienBiziP, P.C.

(57) ABSTRACT

An underwater robot and a control method therefor. The underwater robot includes a robot main body, wherein a dirt suction port is provided at bottom of the robot main body, a first water outlet is provided on top of the robot main body in communication with the dirt suction port, a second water outlet is further provided at bottom of the robot main body in communication with the first water outlet, and the second water outlet is located on a side of the dirt suction port close to a front end; and a water-pumping mechanism and an escape mechanism provided in the robot main body. By means of the underwater robot and the control method therefor, the obstacle crossing capability of the underwater robot is improved.

10 Claims, 5 Drawing Sheets

(51) Int. Cl.

| | |
|---|---|
| *C02F 103/42* | (2006.01) |
| *G05D 1/639* | (2024.01) |
| *G05D 105/10* | (2024.01) |
| *G05D 107/00* | (2024.01) |
| *G05D 109/30* | (2024.01) |

(52) U.S. Cl.
CPC ...... *C02F 2103/42* (2013.01); *G05D 2105/10* (2024.01); *G05D 2107/29* (2024.01); *G05D 2109/38* (2024.01)

(58) Field of Classification Search
CPC .............. G05D 1/639; G05D 2105/10; G05D 2107/29; G05D 2109/38
See application file for complete search history.

(56) References Cited

U.S. PATENT DOCUMENTS

| | | | | |
|---|---|---|---|---|
| 10,294,686 | B1 * | 5/2019 | Erlich ................... | B63H 11/107 |
| 12,270,225 | B1 * | 4/2025 | Wang .................... | E04H 4/1654 |
| 2008/0235887 | A1 * | 10/2008 | Horvath ............... | E04H 4/1654 |
| | | | | 15/1.7 |
| 2009/0094765 | A1 * | 4/2009 | Osaka .................... | B08B 3/024 |
| | | | | 15/1.7 |
| 2012/0279001 | A1 * | 11/2012 | Fu ......................... | E04H 4/1654 |
| | | | | 416/147 |
| 2013/0269729 | A1 * | 10/2013 | Erlich .................. | E04H 4/1663 |
| | | | | 134/10 |
| 2016/0145884 | A1 * | 5/2016 | Erlich .................. | E04H 4/1654 |
| | | | | 15/1.7 |
| 2024/0254795 | A1 * | 8/2024 | Deng .................... | E04H 4/1654 |

* cited by examiner

100

100

Front end ⟷ Rear end

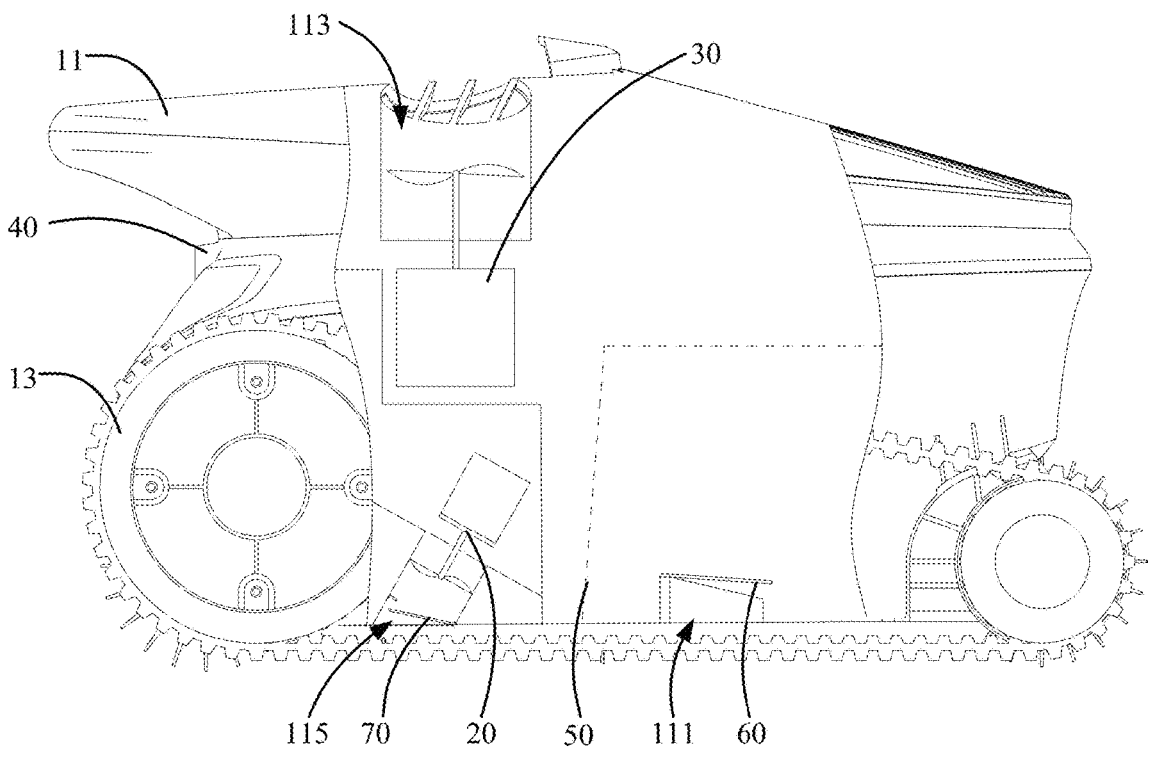

FIG. 4

S10 — After the underwater robot is switched on, controlling the water-pumping mechanism to switch on and the escape mechanism to switch off so as to switch the underwater robot to into the first state, wherein the water stream flows into the underwater robot from the dirt suction port and discharges out of the underwater robot via the first water outlet S20 — Detecting whether an obstacle is on a projected path of the underwater robot; when an object is detected on the projected path of the underwater robot, controlling the water-pumping mechanism to switch off and the escape mechanism to switch on so as to switch the underwater robot to into the second state, wherein the water stream flows into the underwater robot from the first water outlet and discharges out of the underwater robot via the second water outlet to lift the front end of the robot main body by a preset angle

Determining a duration for which the underwater robot is switched to the second state

S23

Controlling the underwater robot to switch to running in the first state when the duration for which the underwater robot is switched to the second state reaches a preset duration

UNDERWATER ROBOT AND CONTROL METHOD THEREFOR

CROSS-REFERENCE TO RELATED APPLICATIONS

This application is a Bypass Continuation Application of PCT International Application No. PCT/CN2023/098132 filed on Jun. 2, 2023, which claims the priority of Chinese Application No. 202310195054.7, filed on Feb. 23, 2023, the disclosures of which are incorporated in their entirety by reference herein.

TECHNICAL FIELD

The present application relates to the technical field of cleaning robots, and particularly relates to an underwater robot and a control method therefor.

BACKGROUND

Underwater robots can be used for various operations in underwater environments, for example, for cleaning a swimming pool. When an underwater robot carries out cleaning operations in a swimming pool, it may be necessary for the underwater robot to go over steps or obstacles at the bottom of the swimming pool or climb onto areas such as side wall surfaces of the swimming pool to clean. Currently, a friction generated by a traveling mechanism (wheels or tracks) of the underwater robot is mainly relied upon to enables the robot to climb onto the steps or obstacles. However, due to a small friction between the traveling mechanism and the side wall of the swimming pool or the side wall of the steps in an underwater environment, it is more difficult for the robot to climb onto the side wall of the swimming pool, the steps and the obstacles, so that the success rate of the underwater robot in climbing onto the side wall of the swimming pool, the steps and the obstacles is affected, and it may also the underwater robot in a certain position, which in turn affects the cleaning range of the underwater robot.

SUMMARY

Technical Field

The present application provides an underwater robot designed to improve the obstacle crossing capability of the underwater robot.

Solution to Problem

The present application provides an underwater robot, including:
- a dirt suction port is provided at a bottom of the robot main body, a first water outlet is provided on a top of the robot main body, the first water outlet is in communication with the dirt suction port, a second water outlet is further provided at the bottom of the robot main body, the second water outlet is in communication with the first water outlet, and the second water outlet is located on a side of the dirt suction port close to the front end; and
- a water-pumping mechanism and an escape mechanism provided in the robot main body.

In a first state, the underwater robot is configured to control water stream to flow into the underwater robot from the dirt suction port and to discharge out of the underwater robot via the first water outlet, the water-pumping mechanism is switched on, and the escape mechanism is switched off;

In a second state, the underwater robot is configured to control water stream to flow into the underwater robot from the first discharge port and to discharge out of the underwater robot via the second water outlet, the water-pumping mechanism is switched off, and the escape mechanism starts is switched on, so as to lift the front end of the robot main body to a preset angle by the water stream discharged via the second water outlet.

In one embodiment of the present application, the water-pumping mechanism is arranged close to the first water outlet;
the escape mechanism is arranged close to the second water outlet.

In one embodiment of the present application, the underwater robot further includes a detector, wherein the underwater robot is switched to the second state when the detector detects an obstacle.

In one embodiment of the present application, the detector includes:
- a distance detector, arranged at the front end of the robot main body, wherein when a distance between the robot main body and the obstacle detected by the distance detector is greater than a preset threshold, the underwater robot is switched to the first state; when the distance between the robot main body and the obstacle detected by the distance detector is less than or equal to a preset threshold, the underwater robot is switched to the second state; and/or
- a gyroscope, arranged inside the robot main body, wherein the underwater robot is switched to the second state when an attitude of the robot main body detected by the gyroscope is determined to be abnormal.

In one embodiment of the present application, a central axis of the first water outlet is arranged vertically relative to the bottom of the robot main body, or the central axis of the first water outlet is arranged obliquely relative to the bottom of the robot main body;
- a central axis of the second water outlet is arranged vertically relative to the bottom of the robot main body; or the central axis of the second water outlet is arranged obliquely relative to the bottom of the robot main body.

In one embodiment of the present application, the underwater robot further includes a filtering component arranged in the robot main body, wherein an opening of the filtering component is in communication with the dirt suction port, the filtering component is arranged to cover the dirt suction port, and the filtering component is further provided with a water-passing port in communication with the first water outlet.

In one embodiment of the present application, the underwater robot further includes a first water-retaining plate rotatably connected to the side of the dirt suction port, the first water-retaining plate opens the dirt suction port when the underwater robot is in the first state, and the first water-retaining plate closes the dirt suction port when the underwater robot is in the second state;
- the underwater robot further includes a second water-retaining plate, wherein the second water-retaining plate is rotatably connected to the side of the second water outlet, the second water-retaining plate closes the second water outlet when the underwater robot is in the first state, and the second water-retaining plate opens the second water outlet when the underwater robot is in the second state.

In one embodiment of the present application, the first water-retaining plate opens the dirt suction port, and the first water-retaining plate rotates to the inside of the robot main body; and when the second water-retaining plate opens the second water outlet, the second water-retaining plate rotates to the outside of the robot main body.

The present invention further provides a control method to control the underwater robot described above, including:

after the underwater robot is switched on, controlling the water-pumping mechanism to switch on and the escape mechanism to switch off so as to switch the underwater robot into the first state, wherein the water stream flows into the underwater robot from the dirt suction port and discharge our of the underwater robot via the first water outlet;

detecting whether an obstacle is on a projected path of the underwater robot; when an object is detected on the projected path of the underwater robot, controlling the water-pumping mechanism to switch off and the escape mechanism to switch on so as to switch the underwater robot into the second state, wherein the water stream flows into the underwater robot from the first water outlet and discharges out of the underwater robot via the second water outlet to lift the front end of the robot main body by a preset angle.

In one embodiment of the present application, when the object is detected on the projected path of the underwater robot, the method further includes:

determining a duration for which the underwater robot is in the second state; and controlling the underwater robot to switch to switch to the first state when the duration for which the underwater robot is in the second state reaches a preset duration.

Advantageous Effect of Invention

In the technical solution of the present application, the underwater robot includes a robot main body, as well as a water-pumping mechanism and an escape mechanism arranged inside the robot main body, wherein the bottom of the robot main body is provided with a dirt suction port and a second water outlet, the top of the robot main body is provided with a first water outlet in communication with the dirt suction port, the first water outlet is in communication with the second water outlet, and the second water outlet is also positioned on the side of the dirt suction port close to the front end. When the underwater robot carries out cleaning operations in a swimming pool and cleans a relatively flat wall surface in the swimming pool, the escape mechanism is switched off, the water-pumping mechanism is switched on, water stream is controlled to flow into the underwater robot from the dirt suction port and discharges out of the underwater robot via the first water outlet, the water stream discharged via the first water outlet generates a downward pressure on the robot main body, so that the robot main body comes into contact with a bottom wall at the bottom of the swimming pool and moves normally; when the underwater robot encounters obstacles such as steep slopes, steps or side walls of the swimming pool, the water-pumping mechanism is switched off, the escape mechanism is switched on, water stream is controlled to flow into the underwater robot from the first water outlet and discharges out of the underwater robot via the second water outlet; since the second water outlet is located at the bottom of the robot main body and arranged close to the front end, at this time, the water stream discharged via the second water outlet generates an upward thrust force on the front end of the robot main body, so that the front end of the robot main body is lifted upwards by a certain angle, that is, the front end of the robot main body becomes warped at a certain angle, so that the robot main body can travel across steep slopes, steps, or climb onto a side wall surface of the swimming pool to enable the underwater robot to cross obstacles easily, and to ensure that the underwater robot can operate in a complex environment.

BRIEF DESCRIPTION OF DRAWINGS

In order to explain the technical solution in the embodiments of the present application or in the prior art more clearly, the accompanying drawings to be used in description of the embodiments or the prior art will be described briefly. Obviously, the accompanying drawings in the following description are only some embodiments of the present application. For those of ordinary skill in the art, other drawings may also be obtained based on the structures shown in these accompanying drawings without making creative efforts.

FIG. 4 is an internal structure diagram of the underwater robot in FIG. 1;

FIG. 5 is an embodiment of a control flow chart of the underwater robot;

REFERENCE SIGNS LIST

TABLE 1

Figure 1:
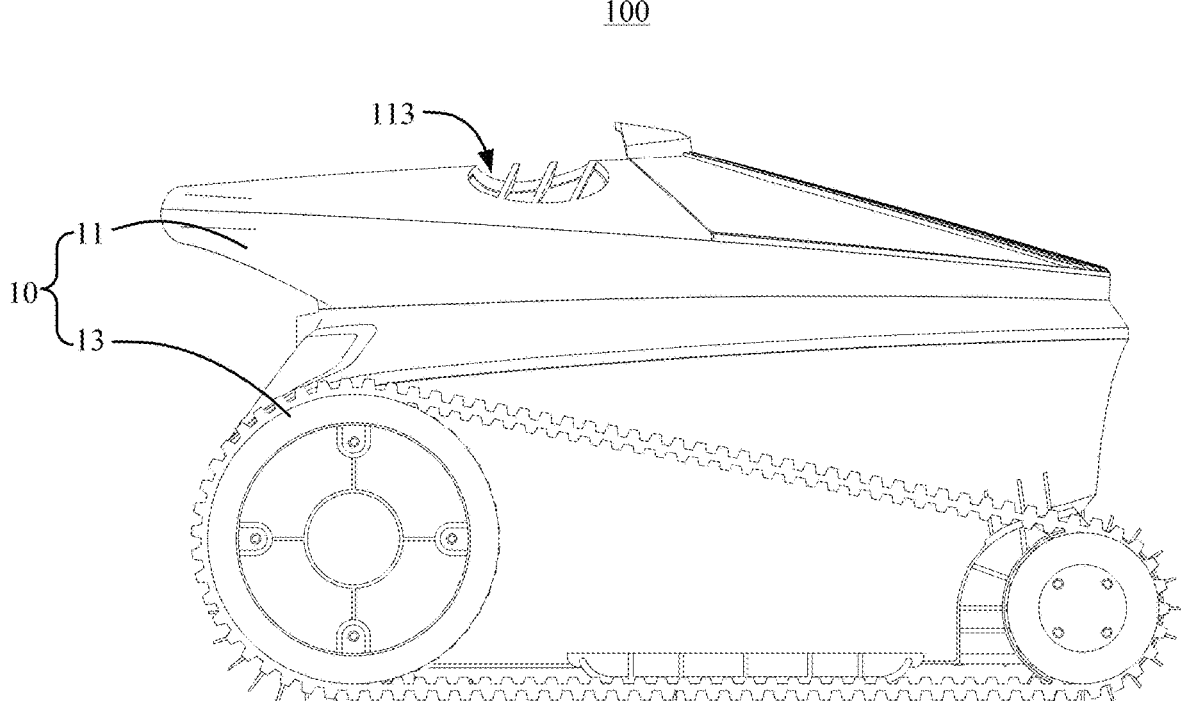
FIG. 1 is a structure diagram of a side of an embodiment of an underwater robot of the present application.

| Reference number | Name | Reference number | Name |
|---|---|---|---|
| 100 | Underwater robot | 15 | Cleaning roller |
| 10 | Robot main body | 20 | Escape mechanism |
| 11 | Casing | 30 | Water-pumping mechanism |
| 111 | Dirt suction port | 40 | Detector |
| 113 | First water outlet | 50 | Filtering component |
| 115 | Second water outlet | 60 | First water-retaining plate |
| 13 | Moving component | 70 | Second water-retaining plate |

The realization of the objectives, functional features and advantages of the present application will be further described in conjunction with the embodiments by reference to the accompanying drawings.

DETAILED DESCRIPTION OF EMBODIMENTS

The technical solution in the embodiments of the present application will be described clearly and completely below in conjunction with the accompanying drawings in the embodiments of the present application. Obviously, the embodiments described are only a part of, rather than all of, the embodiments of the present application. Based on the embodiments in the present application, all other embodiments obtained by those of ordinary skill in the art without making creative efforts should fall into the protection scope of the present application.

It should be noted that if the embodiments of the present application involve directional indications (such as up, down, left, right, front, back . . . ), the directional indications are only used to explain the relative positional relationship, movement and the like between components in a particular attitude (as shown in the drawings), and if this particular attitude is changed, the directional indications also change with it accordingly.

In addition, if the embodiments of the present application contain descriptions involving "first", "second" and the like, the descriptions of the "first", "second" and the like are used for descriptive purposes only, and cannot be understood as indicating or implying their relative importance or implicitly specifying the number of the indicated technical features. As a result, a feature defined with "first" or "second" may include at least one such feature expressly or implicitly. In addition, the technical solutions between various embodiments may be combined with each other, but only on the basis that they are achievable by those of ordinary skill in the art, and when the combination of technical solutions appears to be contradictory or unachievable, it should be considered that such combination of technical solutions does not exist or fall into the protection scope claimed by the present application.

The present application provides an underwater robot 100.

Figure 2:
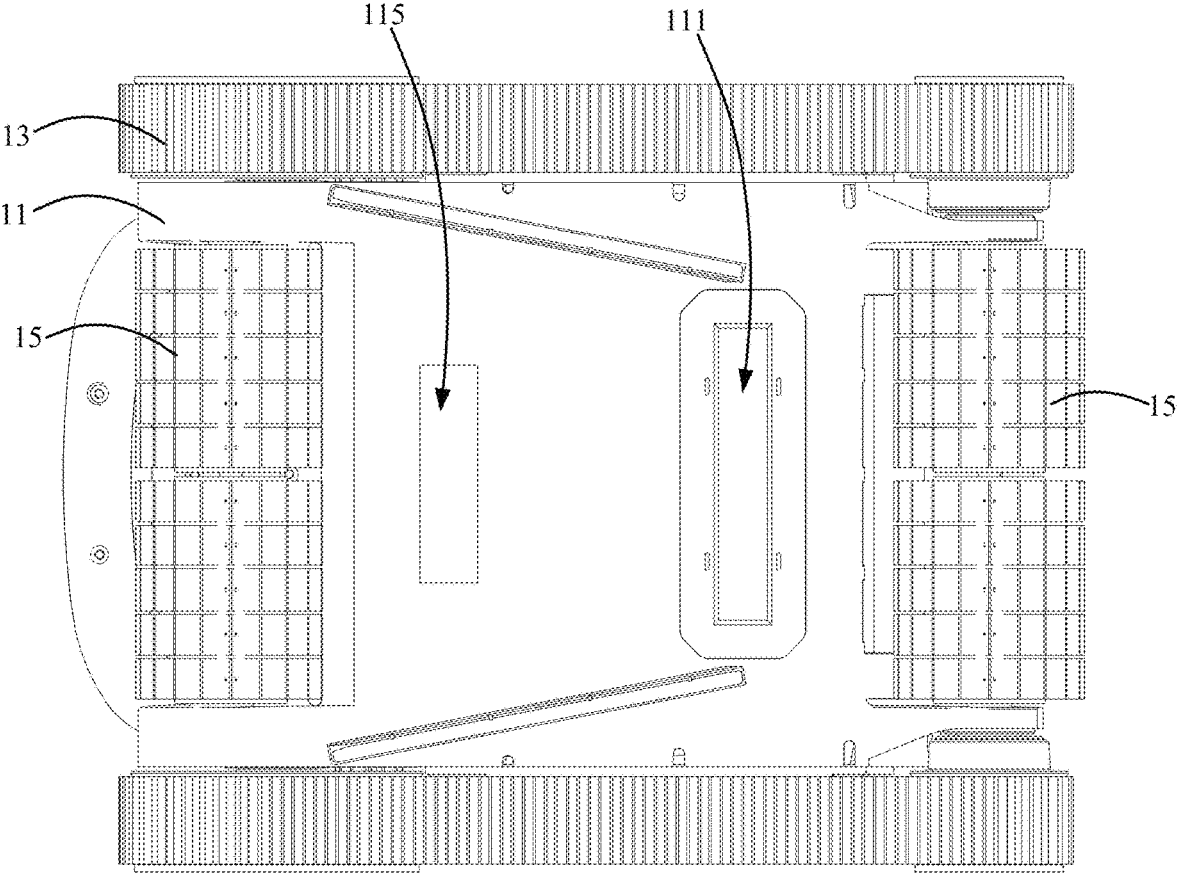
FIG. 2 is a structure diagram of a bottom side of the underwater robot shown in FIG. 1.
Figure 3:
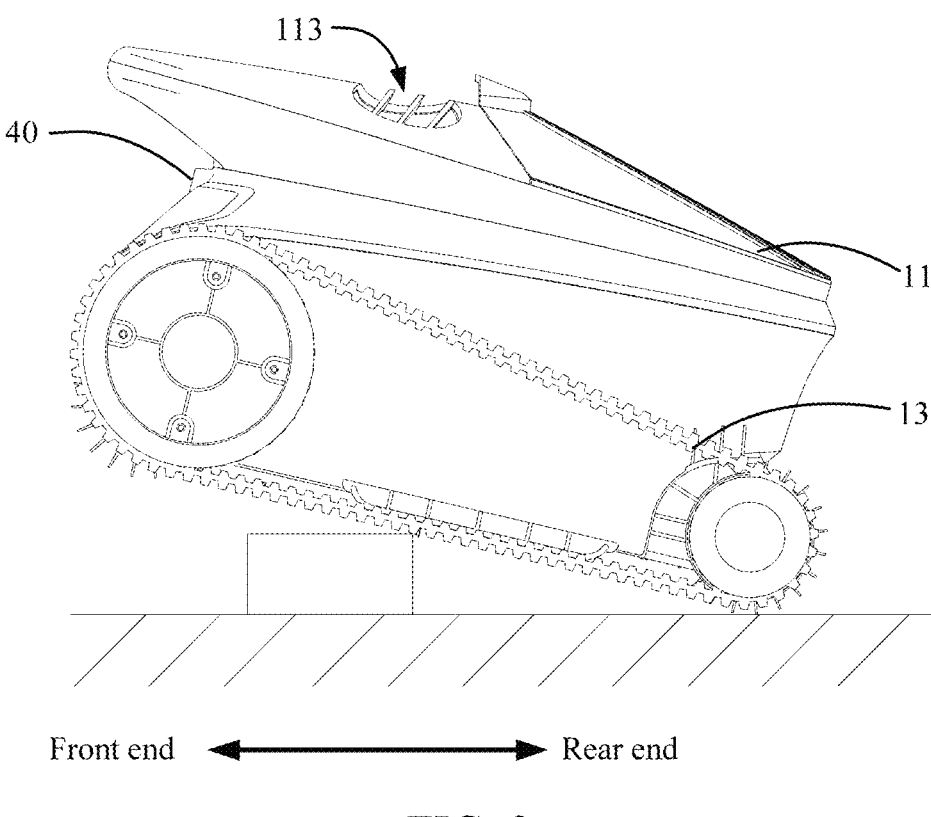
FIG. 3 is a schematic diagram of the underwater robot, shown in FIG. 1, crossing an obstacle.
Figure 6:
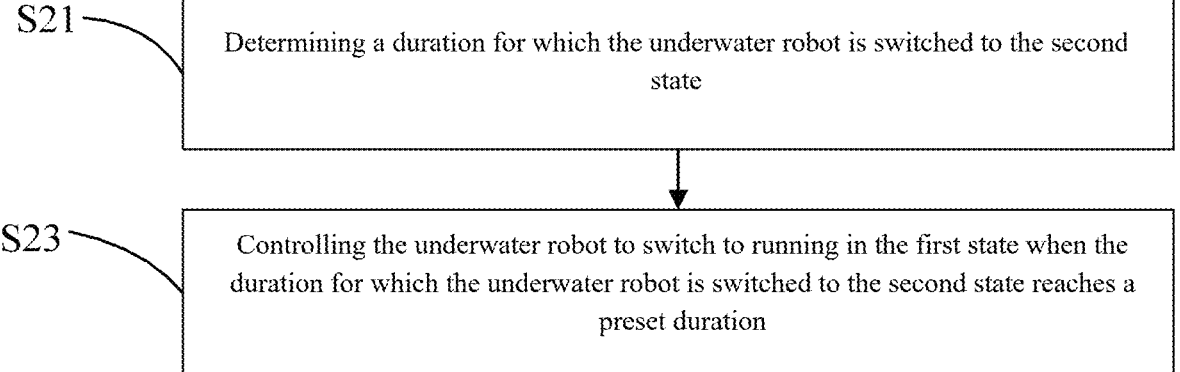
FIG. 6 is another embodiment of a control flow chart of the present application.

As shown in FIGS. 1-4, the underwater robot 100 provided by the present application includes:

a robot main body 10, wherein the robot main body 10 includes a front end, the bottom of the robot main body 10 is provided with a dirt suction port 111, the top of the robot main body 10 is provided with a first water outlet 113 in communication with the dirt suction port 111, the bottom of the robot main body 10 is also provided with a second water outlet 115 in communication with the first water outlet 113, and the second water outlet 115 is located on the side of the dirt suction port 111 close to the front end; and a water-pumping mechanism 30 and an escape mechanism 20 provided in the robot main body 10, the underwater robot 100 has a first state of controlling water stream to flow into the underwater robot from the dirt suction port 111 and discharge via the first water outlet 113; in the first state, the water-pumping mechanism 30 is switched on, and the escape mechanism 20 is switched off;

the underwater robot 100 further has a second state of controlling water stream to flow into the underwater robot from the first discharge port 113 and discharges out of the underwater robot via the second water outlet 115; in the second state, the water-pumping mechanism 30 is switched off, and the escape mechanism 20 is switched on, so as to lift the front end of the robot main body 10 to a preset angle by the water stream discharged via the second water outlet 115.

In the technical solution of the present application, the underwater robot 100 includes a robot main body 10, as well as a water-pumping mechanism 30 and an escape mechanism 20 arranged inside the robot main body 10, wherein the bottom of the robot main body 10 is provided with a dirt suction port 111 and a second water outlet 115, the top of the robot main body 10 is provided with a first water outlet 113 in communication with the dirt suction port 111, the first water outlet 113 is in communication with the second water outlet 115, and the second water outlet 115 is also located on the side of the dirt suction port 111 close to the front end. When the underwater robot 100 carries out cleaning operations in a swimming pool and cleans a relatively flat wall surface in the swimming pool, the escape mechanism 20 is switched off, the water-pumping mechanism 30 is switched on, water stream is controlled to flow into the underwater robot from the dirt suction port 111 and discharges out of the underwater robot via the first water outlet 113, the water stream discharged via the first water outlet 113 generates a downward pressure on the robot main body 10, so that the robot main body 10 comes into contact with a bottom wall at the bottom of the swimming pool and moves normally.

When the underwater robot 100 encounters obstacles such as steep slopes, steps or side walls of the swimming pool, the water-pumping mechanism 30 is switched off, the escape mechanism 20 is switched on, water stream is controlled to flow into the underwater robot from the first water outlet 113 and discharges out of the underwater robot via the second water outlet 115; since the second water outlet 115 is located at the bottom of the robot main body 10 and arranged close to the front end, at this time, the water stream discharged via the second water outlet 115 generates an upward thrust force on the front end of the robot main body 10, so that the front end of the robot main body 10 is lifted upwards by a certain angle, that is, the front end of the robot main body 10 becomes tilts upward at a certain angle, so that the robot main body 10 can travel across steep slopes, steps, or climb onto a side wall surface of the swimming pool to enable the underwater robot 100 to cross obstacles easily, and to ensure that the underwater robot 100 can operate in a complex environment.

In one embodiment of the present application, when the underwater robot 100 is switched from the first state to the second state, the water-pumping mechanism 30 should switch off first, and the escape mechanism 20 should not switch on until the water-pumping mechanism 30 is completely stopped; correspondingly, when the underwater robot 100 is switched from the second state to the first state, the escape mechanism 20 should switch off first, and the water-pumping mechanism 30 should not switch on until the escape mechanism 20 is completely stopped. Such an arrangement can avoid the situation that when either the water-pumping mechanism 30 or the escape mechanism 20 does not completely switch off due to inertia when switched off, if the other of the water-pumping mechanism 30 and the escape mechanism 20 is switched on at this time, it may cause the underwater robot 100 to lose balance.

In this embodiment, the robot main body 10 includes a casing 11, moving components 13, a cleaning roller 15, and a drive mechanism (not indicated in the drawing), the casing 11 has a front end and a rear end arranged opposite to each other, and the front end is usually the end in the traveling direction of the underwater robot. The moving components 13 are arranged on both sides in the width direction of the casing 11 for supporting the casing 11 and parts installed inside the casing 11, the cleaning roller 15 is arranged at the bottom of the casing 11, the drive mechanism is arranged inside the casing 11 and connected with the moving components 13 and the cleaning roller 15 in a transmission way to drive the moving components 13 to drive the entire robot main body 10 moving forward, meanwhile, the drive mechanism also drives the cleaning roller 15 to roll to clean a traveling position.

It may be understood that the casing 11 is also internally provided with a sealed cavity, the sealed cavity is also internally provided with devices such as a battery (not indicated in the drawing), a circuit board (not indicated in the drawing) and a controller (not indicated in the drawing), and the circuit board is electrically connected with the battery, the controller, the water-pumping mechanism 30 and the escape mechanism 20.

In one embodiment, the moving components 13 may be wheel bodies, wherein the diameter of the wheel bodies located at the front end is greater than the diameter of the wheel bodies at the rear end to improve the obstacle-crossing capability of the wheel bodies at the front end. In another embodiment, tracks may be further arranged on the outer side of the wheel bodies, so that the moving components 13 are formed into a track-type structure to increase a contact area and a friction between the robot main body 10 and the pool wall, so as to enable the underwater robot 100 to adapt to a complex environment and to enhance the stability in a moving process.

In another embodiment, the number of the cleaning rollers 15 may be two, and the cleaning rollers 15 may be arranged at both the front end and the back end of the robot main body 10 to improve the cleaning capability of the underwater robot 100.

In this embodiment, the dirt suction port 111 and the first water outlet 113 are in communication to form a first water stream channel (not shown in the drawing), the first water stream channel may be formed directly inside the casing 11, or a first conduit (not shown in the drawing) is arranged between the dirt suction port 111 and the first water outlet 113, and the first water stream channel is formed inside the first conduit. Similarly, the first water outlet 113 and the second water outlet 115 are in communication to form a second water stream channel (not shown in the drawing), the second water stream channel may be formed directly inside the casing 11, or a second conduit (not shown in the drawing) is arranged between the first water outlet 113 and the second water outlet 115, and a second water stream channel is formed inside the second conduit. The arrangement of the first conduit and the second conduit can simplify the design difficulty of the casing 11 and improve the flexibility of the moving directions of the first water stream channel and the second water stream channel.

Further, in one embodiment of the present application, the first water stream channel and the second water stream channel form a junction since the first water stream channel and the second water stream channel share the first water outlet 113. The water-pumping mechanism 30 may be arranged in any position inside the first water stream channel, for example, in one embodiment, the water-pumping mechanism 30 is arranged in a position close to the first water outlet 113, so that the installation and maintenance of the water-pumping mechanism 30 can be facilitated. Similarly, the escape mechanism 20 may also be arranged in any position inside the second water stream channel, for example, the escape mechanism 20 may likewise be arranged in a position close to the second water outlet 115 to facilitate the installation and commissioning of the escape mechanism 20. By separately controlling the operating states of the water-pumping mechanism 30 and the escape mechanism 20, the direction of water stream via the inside of the robot main body 10 is changed to realize switching of the underwater robot 100 between the first state and the second state.

It may be understood that both the water-pumping mechanism 30 and the escape mechanism 20 include motors and propellers, wherein the motors may be fixed to the inner wall surfaces of the water stream channels by structures such as screws or buckles. An axial direction of the motors is also the same as an extension direction of the water stream channels to reduce the area of the water stream channels occupied by the motors and reduce the influence of the motors on the water stream. The propellers are connected with output shafts of the motors, the motors drive the propellers to rotate to generate a negative pressure in the water stream channel, thereby sucking in external water stream and discharging it via the first water outlet 113 or the second water outlet 115, so that the discharged water stream exerts a pressure or thrust force on the robot main body 10.

Still as shown in FIGS. 1-4, in one embodiment of the present application, the underwater robot 100 further includes a detector 40, wherein the underwater robot 100 is switched to the second state when the detector 40 detects an obstacle.

In one embodiment of the present application, the detector 40 may be a distance detector 40, a gyroscope, or provided with both the distance detector 40 and the gyroscope. It may be understood that the distance detector 40 is arranged at the front end of the robot main body 10 for detecting the distance between the robot main body 10 and an obstacle, and providing a data basis for the underwater robot 100 to switch between the operating states. The distance detector 40 may be a distance detector 40 such as a sonar sensor, a photoelectric sensor, a laser distance meter and the like. When a distance between the robot main body 10 and an obstacle is detected to be greater than a preset threshold, the underwater robot 100 is switched to the first state; when a distance between the robot main body 10 and an obstacle is detected to be less than or equal to a preset threshold, the underwater robot 100 is controlled to run in the second state.

It may be understood that the obstacle in this embodiment may be a floor drain at the bottom of the swimming pool, a step, a side wall of the swimming pool and the like. The preset threshold of the distance between the robot main body 10 and the obstacle may be 0.2 m, or 0.3 m, or 1.0 m and the like, which may be reasonably set according to actual requirements.

In another embodiment, the gyroscope, also known as an IMU sensor, enables measurements of a three-axis attitude angle, an angular rate and an acceleration of the underwater robot 100. Typically, the gyroscope is arranged in a central position of the robot main body 10; when an attitude of the underwater robot 100 detected by the gyroscope is determined to be abnormal, it indicates that the underwater robot 100 may have encountered an obstacle, and the underwater robot 100 can be controlled to run in the second state at this time. It may be understood that when no abnormal attitude of the underwater robot 100 is detected, the underwater robot 100 is switched to the first state. It should be noted that abnormal states of the underwater robot 100 include the wheels of the underwater robot 100 idle, the robot main body 10 is tilted, or the robot main body 10 still stays in a certain position for a long time and the like.

Still as shown in FIG. 4, in one embodiment of the present application, a central axis of the first water outlet 113 is arranged vertically relative to the bottom of the robot main body, or the central axis of the first water outlet 113 is arranged obliquely relative to the bottom of the robot main body;

a central axis of the second water outlet 115 is arranged vertically relative to the bottom of the robot main body; or the central axis of the second water outlet 115 is arranged obliquely relative to the bottom of the robot main body.

In the technical solution of this embodiment, since the water stream discharged via the first water outlet 113 exerts a downward pressure on the robot main body 10, the central axis of the first water outlet 113 is set in a vertical direction, so that the water stream discharged via the first water outlet 113 is vertically upward, the water stream exerts a downward pressure on the robot main body 10 in a vertical direction at this time, which in turn increases the friction between the robot main body 10 and the bottom wall, and the cleaning effect can be improved. In another embodiment, the central axis of the first water outlet 113 is arranged obliquely, so that the water stream discharged via the first water outlet 113 flows upwards obliquely, the pressure exerted by the water stream on the robot main body 10 can be decomposed into a vertically downward pressure and a push force towards the robot main body 10 at this time, so that it can assist in the movement of the robot main body 10. It should be understood that the first water outlet 113 is positioned approximately in the center of the top in order to ensure that the force exerted on the robot main body 10 is uniform.

Based on the same principle, the central axis of the second water outlet 115 is set in a vertical direction, so that the water stream discharged via the second water outlet 115 is vertically downward, the water stream exerts a vertical upward thrust force on the robot main body 10 at this time, and the front end of the robot main body 10 can be lifted upwardly at a preset angle under the action of the thrust force, so that the front end of the robot main body 10 can cross an obstacle easily. In another embodiment, the central axis of the second water outlet 115 is arranged obliquely, the water stream discharged via the second water outlet 115 flows forward obliquely at this time, the thrust force exerted by the water stream on the robot main body 10 can be decomposed into an upward thrust force towards the upper side and a drive force towards the front end of the robot main body 10, so that it can assist in the movement of the robot main body 10. In one embodiment, the angle at which the front end of the robot main body 10 is lifted upwards may be 10°, 15°, 20°, 30°, 40° and the like, and this is not defined herein; it should be understood that the angle at which the front end of the robot main body 10 is lifted upwards may be reasonably set according to actual requirements, and this is not defined herein.

Still as shown in FIG. 4, in one embodiment of the present application, the underwater robot 100 further includes a filtering component 50, wherein the filtering component 50 is arranged in the robot main body 10, an opening of the filtering component is in communication with the dirt suction port 111, the filtering component is arranged to cover the dirt suction port 111, and the filtering component 50 is further provided with a water-passing port in communication with the first water outlet 113.

In this embodiment, the filtering component 50 is used to filter and collect cleaned debris, dirt and other substances. The filtering component 50 is arranged inside the casing 11 to prevent the collected debris from pooling and protruding out of the bottom surface of the robot main body 10, which may cause an impact on the underwater robot 100. Specifically, the filtering component 50 may be a structure formed on the casing 11 that is recessed to the inside; the filtering component 50 may also be a removable connection structure for the casing 11, for example, the filtering component 50 may be a strainer with holes formed into a water-passing port; or the filtering component 50 may be a storage box with an opening and a water-passing port, the storage box is fixed to the inside of the casing 11 in a removable manner, and the opening is in communication with the dirt suction port 111. When the underwater robot 100 is switched to the first state and the water stream flows into the underwater robot 100 from the dirt suction port 111 at the bottom of the robot main body 10, debris and dirt in the swimming pool is also sucked into the inside of the filtering component 50 together.

Still as shown in FIG. 4, in one embodiment of the present application, the underwater robot 100 further includes a first water-retaining plate 60, wherein the first water-retaining plate 60 is rotatably connected to the side of the dirt suction port 111, the first water-retaining plate 60 opens the dirt suction port 111 when the underwater robot 100 is switched to the first state, and the first water-retaining plate 60 closes the dirt suction port 111 when the underwater robot 100 is switched to the second state.

In this embodiment, the first water-retaining plate 60 is rotatably connected with the casing 11 by a rotating shaft, the rotating shaft and the first water-retaining plate 60 may form an integrated structure, the rotating shaft and the first water-retaining plate 60 may form a split structure, and both ends of the rotating shaft are rotatably connected with the casing 11. When the underwater robot 100 is switched to the first state, the water-pumping mechanism 30 is switched on, the water pressure at the dirt suction port 111 is greater than the water pressure at the first water outlet 113, so that the first water stream channel generates a negative pressure, and the first water-retaining plate 60 is in a state with the dirt suction port 111 opened under the action of the negative pressure to allow the water stream to flow into the underwater robot from the dirt suction port 111. When the underwater robot 100 is switched to the second state, the water-pumping mechanism 30 is switched off, the water pressure between the dirt suction port 111 and the first water outlet 113 is balanced at this time, and the first water-retaining plate 60 may close the dirt suction port 111 to prevent the debris collected in the filtering component 50 from flowing out. It should be noted that the casing 11 is further provided with a limiting structure (not shown in the drawing) located within the dirt suction port 111 and on the side of the first water-retaining plate 60 away from the rotating shaft, the limiting structure is used to limit the rotation of the first water-retaining plate 60 to the outer side of the casing 11, so that the first water-retaining plate 60 can only be opened towards the inside of the casing 11 in order to avoid opening the first water-retaining plate 60 towards the outer side of the casing 11, which may have an effect on the moving of the underwater robot 100.

Still as shown in FIG. 4, in one embodiment of the present application, the underwater robot 100 further includes a second water-retaining plate 70, wherein the second water-retaining plate 70 is rotatably connected to the side of the second water outlet 115, the second water-retaining plate 70 closes the second water outlet 115 when the underwater robot 100 is switched to the first state, and the second water-retaining plate 70 opens the second water outlet 115 when the underwater robot 100 is switched to the second state.

In this embodiment, the second water-retaining plate 70 is likewise rotatably connected with the casing 11 by a rotating shaft, and the rotating shaft and the second water-retaining plate 70 form either an integrated structure or a split structure, which is not defined herein. Both ends of the rotating shaft are rotatably connected with the casing 11. When the underwater robot 100 is switched to the first state, the escape mechanism 20 is switched off, the water pressure between the second water outlet 115 and the first water outlet 113 is balanced at this time, and the second water-retaining plate 70 is in a state with the second water outlet 115 closed.

When the underwater robot 100 is switched to the second state, the escape mechanism 20 is switched on, the water pressure at the first water outlet 111 is greater than the water pressure at the second water outlet 115, so that a negative pressure is generated in the second water stream channel, and the second water-retaining plate 70 rotates towards the outer side of the casing 11 under the action of the negative pressure, so that the second water-retaining plate 70 can be in a state with the second water outlet 115 opened to enable the water stream to flow into the underwater robot from the first water outlet 113 and to be discharged from the second water outlet 115.

Similarly, the casing 11 is also provided with a limiting structure (not shown in the drawing) located within the second water outlet 115 and on the side of the second water-retaining plate 70 away from the rotating shaft, the limiting structure is used to limit the rotation of the second water-retaining plate 70 to the inside of the casing 11, so that the second water-retaining plate 70 can only be opened towards the outer part of the casing 11. In another possible embodiment, it is also possible that the second water-retaining plate 70 is provided with an area larger than that of the second water outlet 115, so that the second water-retaining plate 70 can only be rotated towards the outer side of the casing 11.

In one embodiment, the first water-retaining plate 60 and the second water-retaining plate 70 may be made of a lightweight material, such as plastic or acrylic and the like.

In another embodiment, an electric motor (not shown in the drawing) may also be arranged to be connected with the first water-retaining plate 60 and the second water-retaining plate 70, respectively, to control the opening or closing of the first water-retaining plate 60 and the second water-retaining plate 70, respectively, through the electric motor and to improve the accuracy.

As shown in FIG. 5, the present invention further provides a control method for the underwater robot 100, including the following steps:

Step S10: after the underwater robot 100 is switched on, controlling the water-pumping mechanism 30 to switch on and the escape mechanism 20 to switch off so as to switch the underwater robot 100 to into a first state, wherein the water stream flows into the underwater robot 100 from a dirt suction port 111 and discharges out of the underwater robot 100 via a first water outlet 113;

Step S20: Detecting whether an obstacle is on a projected path of the underwater robot 100; when an object is detected on the projected path of the underwater robot, controlling the water-pumping mechanism 30 to switch off and the escape mechanism 20 to switch on so as to switch the underwater robot 100 to into the second state, wherein the water stream flows into the underwater robot 100 from the first water outlet 113 and discharges out of the underwater robot 100 via a second water outlet 115 to lift the front end of the robot main body 10 by a preset angle.

In this embodiment, when the underwater robot 100 is switched on, it is operated in the first state by default; at this time, the controller controls the water-pumping mechanism 30 to switch on and the escape mechanism 20 to switch off so as to switch the underwater robot 100 to into the first state, wherein the water stream flows into the underwater robot 100 from the dirt suction port 111 and discharges out of the underwater robot 100 via the first water outlet 113. When the underwater robot 100 is operating, its state is detected in real time; when an object is detected on the projected path of the underwater robot 100, the controller controls the water-pumping mechanism 30 to switch off and the escape mechanism 20 to switch on so as to switch the underwater robot 100 to into the second state, wherein the water stream flows into the underwater robot 100 from the first water outlet 113 and discharges out of the underwater robot 100 via the second water outlet 115 to lift the front end of the robot main body 10 by a preset angle.

In one embodiment, the detector 40 may be a distance detector 40 arranged at the front end of the robot main body 10 for detecting the distance between the robot main body 10 and an obstacle, and providing a data basis for the underwater robot 100 to switch between the operating states. The distance detector 40 may be a distance detector 40 such as a sonar sensor, a photoelectric sensor, a laser distance meter and the like. When a distance between the robot main body 10 and an obstacle is detected to be greater than a preset threshold, the underwater robot 100 is switched to the first state; when a distance between the robot main body 10 and an obstacle is detected to be less than or equal to a preset threshold, the underwater robot 100 is controlled to switch to the second state. The obstacle in this embodiment may be a step at the bottom of the swimming pool, a side wall of the swimming pool and the like. The preset threshold of the distance between the robot main body 10 and the obstacle may be 0.2 m, or 0.3 m, or 1.0 m and the like, which may be reasonably set according to actual requirements.

In another embodiment, the detector 40 may also be a gyroscope. The gyroscope enables attitude measurements of the underwater robot 100, specifically including measurements of a three-axis attitude angle, an angular rate and an acceleration. When the underwater robot 100 walks on a flat wall surface of the swimming pool, the attitude of the underwater robot 100 achieves a balance, and the underwater robot 100 can be controlled to switch to the second state. When an attitude imbalance is caused since the underwater robot 100 encounters a floor drain, a step or other obstacles that cause the wheels to idle, the robot main body 10 to tilt, or the robot main body 10 to appear and stay in a certain position for a long period of time or the like, the underwater robot 100 may be controlled to switch to the second state at this time.

It should be understood that in one embodiment, the detector 40 may also be a combination of the distance detector 40 and the gyroscope, so that the detector 40 detects more accurately, which in turn improves the flexibility of the underwater robot 100.

The detector 40 detects the state of the underwater robot 100 in real time and transmits a detected signal to a controller which receives the detected signal and judges whether the current state is an abnormal state; when it is determined that the underwater robot 100 is in a normal state, the controller controls the water-pumping mechanism 30 to switch on and controls the escape mechanism 20 to close, so that the underwater robot 100 is switched to the first state, water stream flows into the underwater robot 100 from the dirt suction port 111 and is discharged out of the underwater robot 100 via the first water outlet 113, and the water stream discharged via the first water outlet 113 generates a downward pressure on the robot main body 10, so that the robot main body 10 comes into contact with a bottom wall at the bottom of the swimming pool, generates a friction and walks normally.

When it is determined that the underwater robot 100 is in an abnormal state, the controller controls the water-pumping mechanism 30 to be closed and controls the escape mechanism 20 to start operating, so that the underwater robot 100 is switched to the second state, water stream is controlled to flow into the underwater robot 100 from the first water outlet 113 and discharged out of the underwater robot 100 via the second water outlet 115; since the second water outlet 115 is located at the bottom of the robot main body 10 and arranged close to the front end, at this time, the water stream discharged via the second water outlet 115 generates an upward thrust force on the front end of the robot main body 10, so that the front end of the robot main body 10 is lifted upwards by a certain angle, that is, the front end of the robot main body 10 becomes warped at a certain angle, so that the robot main body 10 can travel across steep slopes, steps, or climb onto a side wall surface of the swimming pool to enable the underwater robot 100 to cross obstacles easily, and to ensure that the underwater robot 100 can operate in a complex environment.

Further, as shown in the figures, in one embodiment, when the underwater robot 100 starts running in the second state, it further includes S21: determining a duration for which the underwater robot 100 is switched to the second state; and S23: controlling the underwater robot 100 to switch to the first state when the duration for which the underwater robot 100 is switched to the second state reaches a preset duration. In this embodiment, by prejudging the duration required for the underwater robot 100 to cross an obstacle and setting a corresponding value, when the underwater robot 100 can successfully cross the obstacle or successfully climb onto the side wall of the swimming pool after the underwater robot 100 is switched to the second state for a set duration, the underwater robot 100 is switched to run in the first state to realize the cleaning operation of the underwater robot 100. It should be understood that the preset duration may be reasonably set according to actual requirements, for example, the preset duration may be 5 seconds, 10 seconds, or 20 seconds and the like. It should be noted that there may also be more than one preset duration, so that a reasonable preset duration may be selected according to the size, height and the like of the obstacle to improve the flexibility and the like of the underwater robot 100.

The contents described above are only preferred embodiments of the present application and are not intended to limit the patent scope of the present application, and all equivalent structural transformations made under the inventive concept of the present application using the contents of the description and accompanying drawings of the present application, or directly/indirectly applied in other related technical fields, are included in the patent protection scope of the present application.

The invention claimed is:

1. An underwater robot comprising:
   a robot main body including a front end, wherein a dirt suction port is provided at a bottom of the robot main body, a first water outlet is provided on a top of the robot main body, the first water outlet is in communication with the dirt suction port, a second water outlet is further provided at the bottom of the robot main body, the second water outlet is in communication with the first water outlet, and the second water outlet is located on a side of the dirt suction port close to the front end; and
   a water-pumping mechanism and an escape mechanism provided in the robot main body, wherein
   in a first state, the underwater robot is configured to control water stream to flow into the underwater robot from the dirt suction port and to discharge out of the underwater robot via the first water outlet, the water-pumping mechanism is switched on, and the escape mechanism is switched off;

in a second state, the underwater robot is configured to control water stream to flow into the underwater robot from the first discharge port and to discharge out of the underwater robot via the second water outlet, the water-pumping mechanism is switched off, and the escape mechanism is switched on, so as to lift the front end of the robot main body to a preset angle by the water stream discharged via the second water outlet.

2. The underwater robot of claim 1, wherein the water-pumping mechanism is arranged close to the first water outlet;
   the escape mechanism is arranged close to the second water outlet.

3. The underwater robot of claim 1, wherein the underwater robot further comprises a detector, and the underwater robot is switched to the second state when the detector detects an obstacle.

4. The underwater robot of claim 3, wherein the detector comprises:
   a distance detector arranged at the front end of the robot main body, wherein when a distance between the robot main body and the obstacle detected by the distance detector is greater than a preset threshold, the underwater robot is switched to the first state; when the distance between the robot main body and the obstacle detected by the distance detector is less than or equal to a preset threshold, the underwater robot is switched to the second state; and/or
   a gyroscope arranged inside the robot main body, wherein the underwater robot is switched to the second state when an attitude of the robot main body detected by the gyroscope is determined to be abnormal.

5. The underwater robot of claim 1, wherein a central axis of the first water outlet is arranged vertically relative to the bottom of the robot main body, or the central axis of the first water outlet is arranged obliquely relative to the bottom of the robot main body;
   a central axis of the second water outlet is arranged vertically relative to the bottom of the robot main body; or the central axis of the second water outlet is arranged obliquely relative to the bottom of the robot main body.

6. The underwater robot of claim 1, wherein the underwater robot further comprises a filtering component arranged in the robot main body, wherein an opening of the filtering component is in communication with the dirt suction port, the filtering component is arranged to cover the dirt suction port, and the filtering component is further provided with a water-passing port in communication with the first water outlet.

7. The underwater robot of claim 1, further comprising:
   a first water-retaining plate rotatably connected to the side of the dirt suction port, wherein the first water-retaining plate opens the dirt suction port when the underwater robot is in the first state, and the first water-retaining plate closes the dirt suction port when the underwater robot is in the second state;
   a second water-retaining plate rotatably connected to a side of the second water outlet, wherein the second water-retaining plate closes the second water outlet when the underwater robot is in the first state, and the second water-retaining plate opens the second water outlet when the underwater robot is in the second state.

8. The underwater robot of claim 7, wherein the first water-retaining plate opens the dirt suction port, and the first water-retaining plate rotates to an inside of the robot main body; and when the second water-retaining plate opens the second water outlet, the second water-retaining plate rotates to an outside of the robot main body.

9. A control method to control the underwater robot described in claim 1, the control method comprising:

after the underwater robot is switched on, controlling the water-pumping mechanism to switch on and the escape mechanism to switch off so as to switch the underwater robot into the first state, wherein the water stream flows into the underwater robot from the dirt suction port and discharges out of the underwater robot via the first water outlet;

detecting whether an obstacle is on a projected path of the underwater robot; when an object is detected on the projected path of the underwater robot, controlling the water-pumping mechanism to switch off and the escape mechanism to switch on so as to switch the under-water robot into the second state, wherein the water stream flows into the underwater robot from the first water outlet and discharges out of the underwater robot via the second water outlet to lift the front end of the robot main body by a preset angle.

10. The control method of claim 9, wherein when the object is detected on the projected path of the underwater robot, the method further comprises:

determining a duration for which the underwater robot is in the second state; and controlling the underwater robot to switch to switch to the first state when the duration for which the underwater robot is in the second state is longer than a preset duration.

\* \* \* \* \*